Feb. 17, 1931.  J. F. O'CONNOR  1,793,124
JOURNAL BEARING
Original Filed Oct. 1, 1927
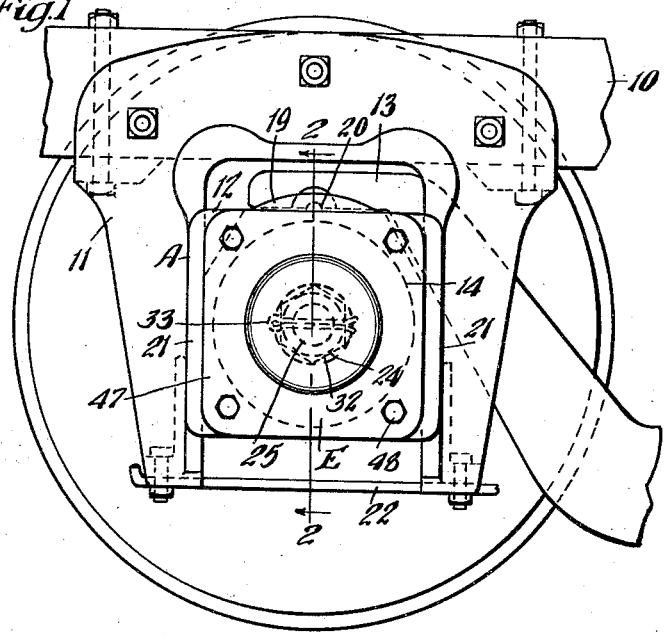
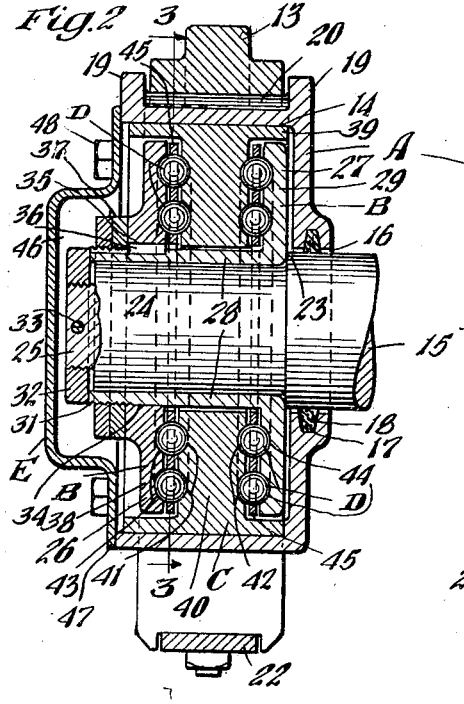
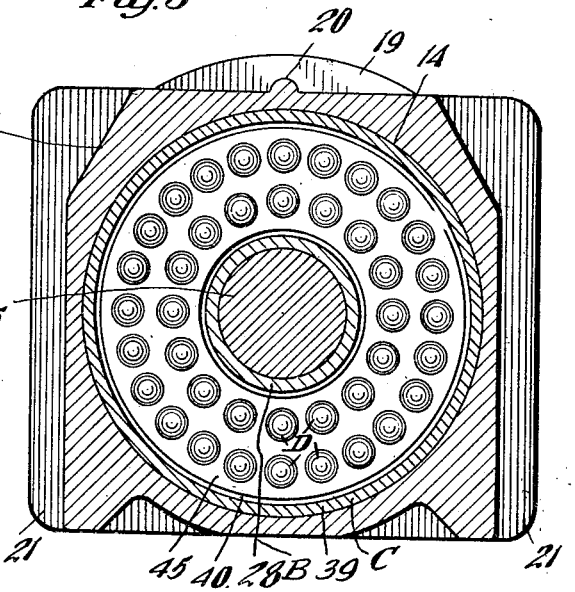
Witness
Wm. Geiger
Inventor
John F. O'Connor
By George I. Haight
His Atty.

Patented Feb. 17, 1931

1,793,124

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

JOURNAL BEARING

Application filed October 1, 1927, Serial No. 223,273. Renewed March 27, 1930.

This invention relates to improvements in journal bearings.

An object of the invention is to provide a ball bearing arrangement, more particularly adapted for use in connection with the journal boxes and journals of railway cars, and wherein the journal and journal box race members are provided in vertically overlapping relation, and the side faces of the race members provided with concentric annular grooves for the reception of concentric annular series of balls, whereby each ball of each series is disposed partially in the groove of one and partially in the groove of another of adjacent race members, so that all of the balls at all times are under load, and a compact and efficient arrangement is produced.

Other and further objects of the invention will more fully and clearly appear from the description and claims hereinafter following.

In the drawings forming a part of this specification, Figure 1 is a side elevational view of a fragment of a railway car truck, showing a truck pedestal member and a journal box, embodying the invention, mounted in said pedestal member. Figure 2 is a transverse vertical sectional view corresponding substantially to the line 2—2 of Figure 1. And Figure 3 is a vertical sectional view, corresponding substantially to the line 3—3 of Figure 2.

As shown in the drawing, 10 represents a fragment of the body portion of a car truck, and 11 represents a common type of pedestal member mounted thereon, having the usual spaced jaws between which is slidably disposed a journal box 12 embodying the invention. The numeral 13 indicates one end of an equalizer bar which bears upon the top of the journal box 12 and transmits the load from the frame of the truck to the top of the journal box, which in turn transmits the load to the axle.

The invention broadly contemplates the provision of a journal box A, journal race members B, journal box race member C, ball bearings D, and cap E.

The journal box A comprises side, top, bottom and rear walls, and is of hollow construction having a centrally disposed annular recess 14 adapted for the reception of the journal 15. The journal 15 projects through an aperture 16 in the rear wall of the journal box, and the edge of the rear wall defining the aperture 16 is provided with a groove 17 for the reception of packing material 18, as shown in Figure 2. The top wall of the journal box A is provided with the usual spaced flanges 19—19, and an equalizer seat 20 for the reception of the equalizer bar 13. The side walls of the journal box A are also provided with spaced flanges indicated at 21—21, the flanges 21—21 being adapted to fit upon the opposite sides of the pedestal jaws to provide guides in the usual manner, the journal box A being retained in its position between the jaws of the pedestal member by the usual strap 22.

The journal 15 is formed to provide an annular shoulder 23, a cylindrical portion 24, and a reduced threaded end portion 25. mounted upon the journal 15 are the journal race members B. These race members are preferably two in number and are best shown in Figure 2, being indicated by the numerals 26 and 27. The race member 27 is in the form of a sleeve 28 fitted upon the cylindrical portion 24 of the journal, and at its inner end is provided with a relatively heavy flange 29, the inner surface of which bears against the shoulder 23 of the journal when the sleeve is in position thereon. The outer portion of the journal 15 is provided with a longitudinally extending groove 30 adapted for the reception of a key as hereinafter described. The outer extremity of the sleeve 28 is provided with threads 31 as shown. The sleeve 28 is held in position on the journal by means of a nut 32 threaded on the end portion 25, said nut being locked in position by means of a pin 33. The race member 26 comprises a cylindrical portion 34 provided with a slot 35 for reception of the key 36 which enters the slot in the sleeve 28, to bring about movement of the member 26 in unison with the sleeve 28, the member 26 being held in position by means of the nuts 37 screwed onto the threads 31 of the sleeve 28. The member 26 is provided with an annular vertically extending flange 38 corresponding to the flange 29 of the member 27. The flanges 38 and 29 are adapted to bear against the ball bearings D and journal box race member C in a manner which will now be described.

The journal box race member C is provided with an annular portion 39 which is non-rotatably disposed in the annular recess 14 of the journal box A, and is provided with a relatively heavy inwardly disposed central flange 40 which projects inwardly between the flanges 38 and 29 of the members 26 and 27, and in spaced relation with reference thereto, the inner periphery of the flange 40 defining an annular opening of somewhat greater diameter than the sleeve 28, so that the inner periphery is spaced from said sleeve. The opposite side faces of the flange 40 are each provided with a pair of concentrically disposed, semi-circular grooves 41 and 42. The inner surface of the flange 38 of the member 26 is provided with corresponding grooves 43, while the inner surface of the flange 29 is provided with corresponding grooves 44, the grooves being arranged for the reception of the ball bearings D.

The ball bearings D are arranged in two concentric vertical series disposed in the grooves, two annular series being arranged on one side of the flange 40, and two upon the opposite side of said flange, and each ball of each series is disposed partly in the groove of one of the flanges 26 and 27, and partly in the corresponding groove of the flange 40, the balls in this way being disposed in vertical shear, so that upon relative movement between the race members B and C, the load will be transmitted to all of the balls of all series.

The balls D are held in position by suitable retainers indicated at 45, each of which is in the form of a flat circular plate provided with a plurality of spaced holes arranged in concentric circles, corresponding to the positions which the balls are to occupy, the retainers being carried by said balls.

The cap E is provided with a socket portion 46 adapted to be disposed about the end of the journal and associated parts and is provided with a flange 47 which is secured to the body portion of the journal box A by suitable bolts 48.

By the above described construction the load is transmitted to the equalizer bar 13 which in turn imposes the load upon the top of the journal box A. The load is then transmitted to the race member C, to the balls D, and thence to the race members B. The imposition of the load in this manner effects some slight relative movement of the members B with reference to the member C, and due to the fact that the balls are disposed partly in the grooves of one member and partly in the grooves of the adjacent member, the balls are in vertical shear, and thus transmit the load to all of the balls, at the bottom and sides of the journal, as well as to those situated at the top which ordinarily directly suspend the full load, so that the load is uniformly distributed to all of the balls at all times.

While I have herein shown and described what I consider the preferred manner of carrying out the invention, the same is merely illustrative, and I contemplate all changes and modifications which come within the scope of the claims appended hereto.

I claim:

1. In a construction of the character described, the combination with a journal box provided with an opening and having a removable cover plate closing said opening, and a cooperating journal; of race members carried by said journal, the race members being spaced apart, one of said race members having a central opening therein and the other race member having a sleeve section surrounding the journal and extending through the opening of the first named race member; removable means secured to the sleeve and engaging the cooperating race member to hold said race members assembled as a unit; a removable race member carried by the journal box and extending between said spaced members, all of said race members being provided with annular grooves; and an annular series of balls disposed in said grooves, each of said balls being arranged partly in a groove of the journal box race member and partly within the groove of one of the race members of the journal.

2. In a construction of the character described, the combination with a journal box and journal; of journal race members comprising a sleeve mounted on said journal and having a disc-like upstanding flange thereon, the inner face of which is provided with an annular groove, and a cooperating disc-like race member having a central opening through which said sleeve extends, said sleeve having an annular groove on the inner side thereof; a removable annular race member within said journal box and having a ring-like flange portion extending between the disc-like member and the disc-like flange of said first named race members, said ring-like flange portion having annular grooves on opposite sides thereof, registering with said first named grooves, respectively; and annular series of balls interposed between the ring-like flange portion of said journal box race member and each of said disc-like members and engaging within the registering grooves thereof; and means secured to said sleeve, engaging the disc-like race member to hold said journal race members, journal box race member and balls assembled.

3. In a construction of the character described, the combination with a journal box held against rotation; of a journal member rotatable within said box; race members removably carried by said journal and journal box, the race members of the journal being rotatable with the journal and having spaced disc-like sections provided with annular grooves on the inner sides thereof, said journal box race member having an annular flange section disposed between said disc-like sections and provided with annular grooves opposed to said first named grooves; and concentric series of anti-friction elements interposed between said annular flange section and the disc-like sections and working in said grooves, each of said anti-friction elements being disposed partly in one and partly in another of adjacent grooves.

In witness that I claim the foregoing I have hereunto subscribed my name this 28th day of September, 1927.

JOHN F. O'CONNOR.